Feb. 21, 1933. A. C. ROWLEY 1,898,898
PIPE HANGER
Filed March 13, 1931
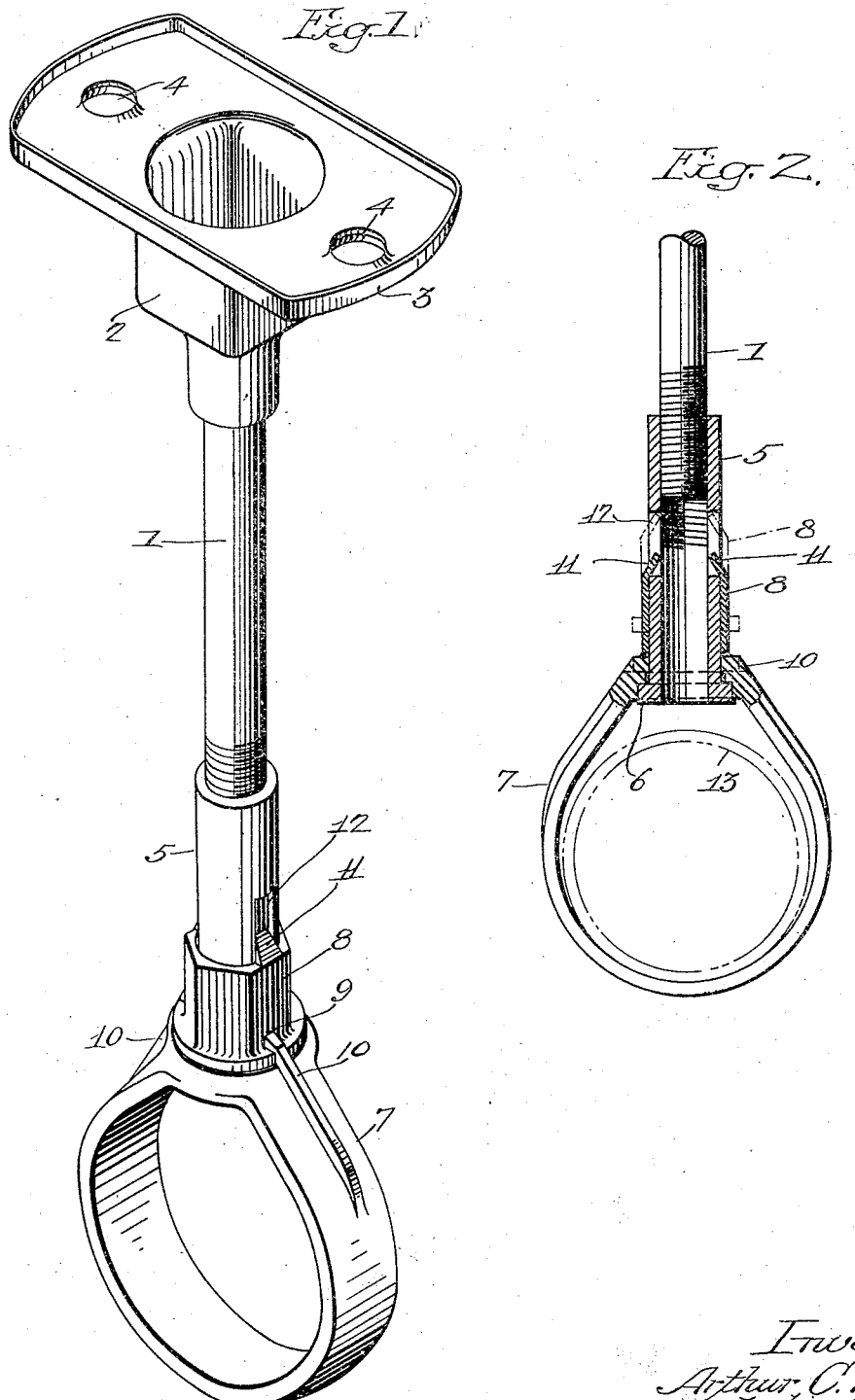
Inventor:
Arthur C. Rowley
By his Attorneys
Howson & Howson Patented Feb. 21, 1933

1,898,898

UNITED STATES PATENT OFFICE

ARTHUR C. ROWLEY, OF PHILADELPHIA, PENNSYLVANIA, ASSIGNOR TO GLOBE AUTOMATIC SPRINKLER COMPANY, OF PHILADELPHIA, PENNSYLVANIA, A CORPORATION OF PENNSYLVANIA

PIPE HANGER

Application filed March 13, 1931. Serial No. 522,350.

This invention relates to improvements in hangers or supports for pipes, rods, cables and the like, and a principal object of the invention is to provide a simple adjustable device of the stated character having means for preventing accidental operation of the adjusting elements.

The invention further resides in a novel and advantageous arrangement and combination of elements and in certain structural details hereinafter set forth and illustrated in the attached drawing, in which:

Figure 1 is a view in perspective of a hanger made in accordance with my invention, and Fig. 2 is a fragmentary partial sectional view illustrating the structural details.

With reference to the drawing, my device in a preferred embodiment comprises a suspension or support member 1 which in the present embodiment takes the form of a bolt, the head of which is confined within a rectangular socket 2 in an escutcheon member 3 adapted to be secured to a ceiling or other supporting structure by means of suitable screws or bolts (not shown) which are passed through apertures 4 in said escutcheon. The head of the member 1 is in the present instance shaped to fit the socket 2 whereby rotation of the bolt with respect to the escutcheon is prevented.

The lower end of the bolt 1 is threaded for reception of a correspondingly and internally threaded sleeve 5, the lower end of this sleeve having a head or projecting flange 6, see Fig. 2, which supports an annular pipe-embracing member or cradle 7, the sleeve 5 being passed upwardly through an aperture in the upper portion of the member 7, as illustrated in Fig. 2. The sleeve 5 may be rotated with respect to the member 7, but normally such relative movement of these parts is prevented by a locking member 8 which fits slidably around the sleeve 5, and which has in the lower ends thereof slots 9 which are adapted to receive projecting flanges or lugs 10 on the member 7 whereby the members 8 and 7 are interlocked against relative rotational movement. The member 8 has at its upper end a pair of lugs 11 which project inwardly into slotted recesses 12 in the sides of the sleeve 5, the recesses 12 being of sufficient length to permit adjustment of the member 8 longitudinally of the sleeve to an extent sufficient to release the flanges 10 from the slots 9 whereby the member 8 and the entire sleeve 5 may be freely rotated with respect both to the bolt 1 and the cradle 7. Such adjustment of the sleeve 5 with respect to the interconnected members has the effect of elevating or lowering the member 7 with respect to the member 1.

The member 8 is continuously interlocked with the sleeve 5 through the medium of the lugs 11, and when in the position illustrated in Fig. 1 of the drawing and with the flanges 10 projecting into the slots 9, this member is also interlocked with the cradle 7 whereby rotational movement of the sleeve with respect to this latter member is prevented. In assembly, the cradle 7 is prevented from rotation by the pipe 13, see Fig. 2, so that with the member 1 anchored against rotation in the fixed escutcheon member 3, there can be no rotation of the sleeve 5 with respect to either the member 1 or the cradle 7. As previously set forth, elevation of the locking member 8 into the position illustrated in broken lines in Fig. 2 releases the sleeve and permits rotation of the latter, effecting a relative adjustment of the support member 1 and the cradle 7.

The invention provides a simple efficient and fool-proof hanger readily adjustable as to length. It will be understood, however, that there may be considerable modification in detail without departure from the essential features of the invention as defined by the appended claim.

I claim:

In a pipe hanger, the combination with a support member including a non-rotatable threaded stem, of a sleeve threaded to said stem and having a longitudinal recess in the side thereof, a pipe cradle rotatably secured to said sleeve and having a projecting lug, and a locking member embracing the sleeve and adjustable longitudinally thereof and having a lug projecting into said longitudinal recess, and a recess for reception of said cradle lug whereby said locking member may be interlocked both with the sleeve and with the cradle, said locking member being adjustable longitudinally of the sleeve to a position releasing said lug to permit rotation of the sleeve with respect both to the said stem and the cradle.

ARTHUR C. ROWLEY.